United States Patent [19]
Ridgway et al.

[11] 3,727,442
[45] Apr. 17, 1973

[54] AUTOMATIC STAMPING PRESS ARRANGEMENT AND METHOD OF OPERATION

[75] Inventors: Merrill L. Ridgway, Minster; Robert M. Carabbio; Robert D. Jordan, both of St. Marys; Donald N. Seyfried, New Bremen; Philip V. Monnin, Minster, all of Ohio

[73] Assignee: The Minster Machine Company, Minster, Ohio

[22] Filed: Sept. 21, 1970

[21] Appl. No.: 73,702

[52] U.S. Cl. ..........................72/7, 29/568, 72/428, 72/446
[51] Int. Cl. ................................................B21j 9/10
[58] Field of Search .....................29/568; 72/7, 421, 72/426, 428, 419, 446, 447, 448

[56] References Cited

UNITED STATES PATENTS

| | | | |
|---|---|---|---|
| 957,203 | 4/1910 | Gail | 72/427 |
| 2,120,402 | 6/1938 | Glasner | 72/427 |
| 2,871,811 | 2/1959 | Gietl | 72/427 |
| 2,942,643 | 6/1960 | Pucci | 72/338 |
| 3,200,492 | 8/1965 | Lehmkuhl | 29/568 |
| 3,241,345 | 3/1966 | Samuel | 29/568 |
| 3,277,568 | 10/1966 | Wetzel | 29/568 |
| 3,431,635 | 3/1969 | Balding | 29/568 |
| 3,449,991 | 6/1969 | Daniels | 83/71 |
| 3,157,283 | 11/1964 | Maass | 29/568 |
| 3,234,648 | 2/1966 | Knowles | 29/568 |

Primary Examiner—Charles W. Lanham
Assistant Examiner—Gene P. Crosby
Attorney—Jeffers and Rickert

[57] ABSTRACT

The specification discloses an automated stamping press arrangement in which die sets are carried in a first storage unit from which unit the die sets can be selectively inserted into and removed from the stamping press. A second storage and handling unit carrying supplies of strip stock is provided adjacent the press and selectively presents a coil of strip stock to serve as the raw material from which stamped parts are manufactured. The feeding of the strip stock is controlled in conformity with the amount required on each stroke of the press for the respective die set in the press, and the number of press cycles is controlled to provide for a desired number of workpieces from a respective die set. A control system is provided utilizing, for example, a punched card which programs the operation of the press with respect to die selection, stock selection, press adjustments and feeding of the stock.

38 Claims, 10 Drawing Figures

AUTOMATIC STAMPING PRESS ARRANGEMENT AND METHOD OF OPERATION

BACKGROUND OF THE INVENTION

The present invention relates to stamping presses and the like and is particularly concerned with a fully automated stamping press.

Presses for cutting, blanking and shaping sheet metal stock are well known. Heretofore, such presses have never been more than semi-automated in operation, although automatic stock feeding arrangements and quick change die set arrangements have been utilized. Even with such arrangements, it has heretofore been necessary, when changing from one workpiece to another, to manually change the die sets in the press, and to manually adjust the press to the die set and, usually, to manually change the type of stock being supplied to the press before the new type workpiece can be produced.

When an extremely long run of a standard workpiece is to be made, the manual changing of die sets together with the adjustment of the press to accommodate the die set and the supply of a particular type of stock to the press represents no particular difficulty or loss of time because of the long running time relative to the set-up time. However, when it becomes necessary or desirable for any reason, to run a fairly small number of workpieces, perhaps only a few hundred or few thousand, and then change to another type workpiece, the skilled labor time lost in changing the set-up of the press can be substantial while, furthermore, during the changing of the set-up of the press, extremely valuable press time is lost.

With the foregoing in mind, a particular object of the present invention is the provision of a press arrangement in which the changing of die sets in the press, and the changing of the stock supply thereto, the adjusting of the press parameters to adapt the press to the respective die set, and the adjusting of the amount of feed of the stock for the respective die set, are all accomplished automatically.

Another object of the present invention is the provision of a press arrangement of the nature referred to, in which a plurality of die sets can be inserted into and removed from the working space of a press selectively while the press shut height, or the like, is also automatically adjusted in conformity with the respective die set placed therein.

A still further object is the provision of a method of operating a press so that the press can run substantially fully automatically while still being capable of producing a variety of workpieces.

It is also an object to provide a method and apparatus for the production of workpieces by stamping operations, in which a plurality of workpieces can be programmed at one time and the operations of die selection, stock selection, press adjustment, stock feeding and the counting of workpieces will be under programmed control at all times.

BRIEF SUMMARY OF THE INVENTION

The present invention incorporates as the basic unit of the system, a punch press adapted for having die sets placed therein. The die sets may, for example, be multiple station die sets capable of producing relatively complex workpieces by a series of operations performed on a strip of stock fed through the die set. Single die sets, however, can be used, or a combination of simple and complex die sets.

At one side of the press there is an automatic stock handler, of a turret-type design, for example, adapted for supporting and interchanging two or more reels of coil stock. Each reel of coil stock is provided with a set of pinch, or gripper, rolls for gripping and advancing the stock as directed by the control system. The stock fed out from a reel of coil stock in supply position is directed through a series of straightening rollers to remove the bend, and any kinks, from the coil stock. From the straightening rollers the stock is supplied to the press to be passed through the die set therein. On the approach side of the press is a set of feed rolls which controls the amount of stock fed on each cycle of the press.

Adjacent the press, for example, in back of the press, and aligned with the working space of the press is an automatic die set storing and handling arrangement, for example, of a turret or carousel configuration. However, the automatic die set storing and handling unit may be constructed in a rectangular matrix or in a linear array as desired. The die set carrying arrangement has compartments which carry a plurality of die sets and, in each rotated position of the turret-type die set carrying arrangement, a respective die set is in registration with the working space of the press. A die set so registered with the working space of the press can be inserted automatically into the working space of the press and connected to the press bed and the press slide in a quick change fixture for being actuated by the press as the slide reciprocates therein.

A smooth die plate or set of die plates may also be carried in the die set storage and handling unit to be used, if required, as a bridge die or support to aid in the guiding of the end of the strip of coil stock across the die area of the press. When used, the bridge die would occupy the space normally occupied by a normal die set, presenting a smooth surface over which the end of the stock may be fed. Following retraction of the stock from the die area the bridge die or support unit would be removed to permit the insertion of the required working die set.

At the beginning of a cycle, the end of the selected coil of stock is fed into the press and cut off prior to the insertion of the respective die set, and then retracted so that when the die set is inserted into the press a squarely trimmed unperforated strip of stock is ready for operation in the die set. After the strip of stock has thus been fed into the press and cut off, it is, as mentioned, retracted from the working space of the press prior to the insertion of the die set therein. When the stock is retracted it falls into a loop between the press and the straightening rolls, and the straightening rolls are then controlled to maintain the said loop within predetermined limits, thus maintaining an adequate supply of stock ahead of the press at all times.

The entire arrangement is under the control of a control system adapted for sensing a record member such as a punched card. The punched card provides for introducing parameters for control of the components above referred to and, additionally, controls the adjustment of the press to provide for the correct speed and shut height of the press for the respective die set being operated, and also counts the number of cycles of the press so that a predetermined number of workpieces can be operated by a respective die set in the press.

At the end of the period of operation of the die set, namely, when the desired number of workpiece have been produced thereby, the press is stopped in retracted position, namely, with the slide at the top of the stroke and with the press shut height adjusted to maximum open position. The partially processed stock in the die set may then be automatically advanced to cut off position and be cut off, thereby disposing of all of the partially formed workpieces in the end of the strip, assuming the press operating cycle is so programmed and providing the particular die set in the press does not interfere with such an advance of the stock. Otherwise, the press operating cycle may be programmed to retract the partly stamped end of the stock strip out of the die area, remove the die set into the die storage and handling unit, insert the bridge die set into the press, and then advance the end of the stock strip across the die area to be trimmed off by the fixed stock trimming die. Another alternative available is to store the stock trimming die set in the die set storage and handling unit, and to introduce it into the press whenever called for by the program for trimming the end of the stock. These alternatives as well as others in the stamping system operating cycle may all be provided within the framework of the basic invention.

When the end of the stock strip is advanced across the die area for trimming, this advance motion also has the effect of substantially eliminating the slack loop in the stock between the straightening rolls and the feed rolls in the press. The stock is then retracted to inoperative position prior to the insertion of a new die set into the press.

By operating in the aforementioned manner, any desired number of workpieces can be made from any of a selected number of die sets without any interruption of the operation of the press, whereby the operating time of the press is maintained at a maximum while the amount of labor required for operating the press while forming workpieces and for set-up and shut-down operation is greatly reduced.

These and other objects and advantages of the present invention will become more apparent upon reference to the following detailed specification taken in connection with the accompanying drawings, in which:

DETAILED DESCRIPTION

Figure 1A:
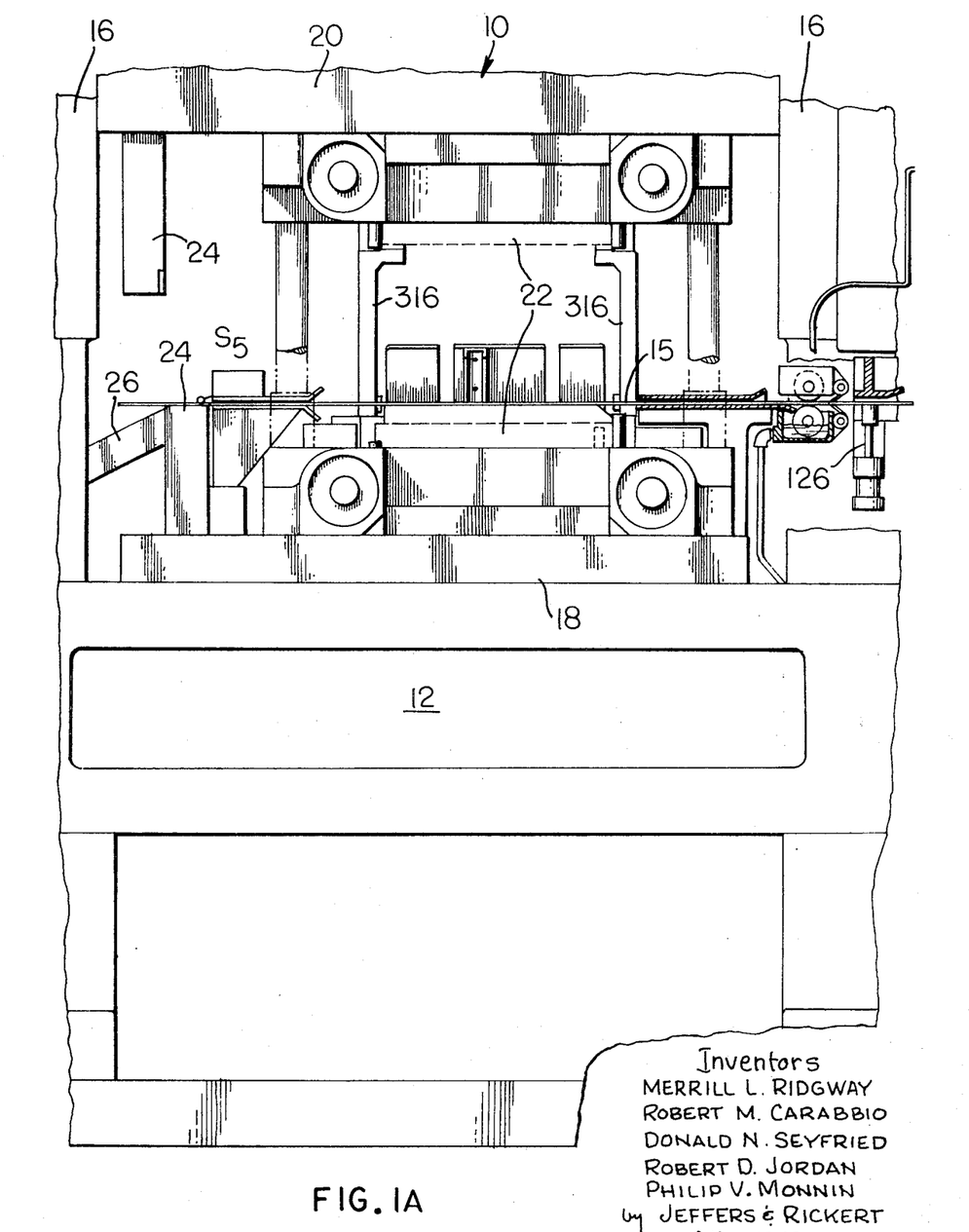
FIGS. 1A, 1B, 1C and 1D are views taken from the front of the press showing respective portions of the press arrangement progressing from left to right.
Figure 1B:
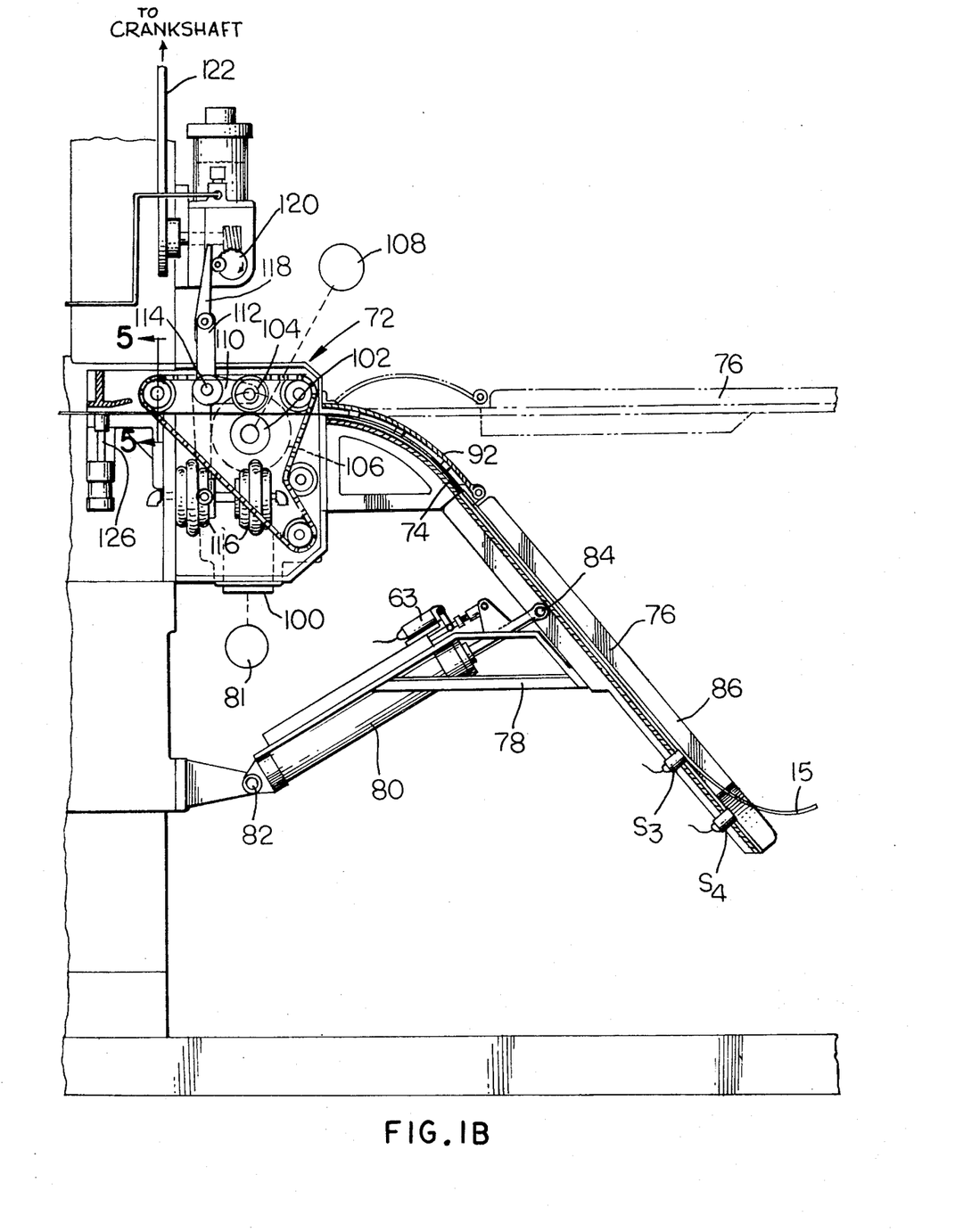
Figure 1C:
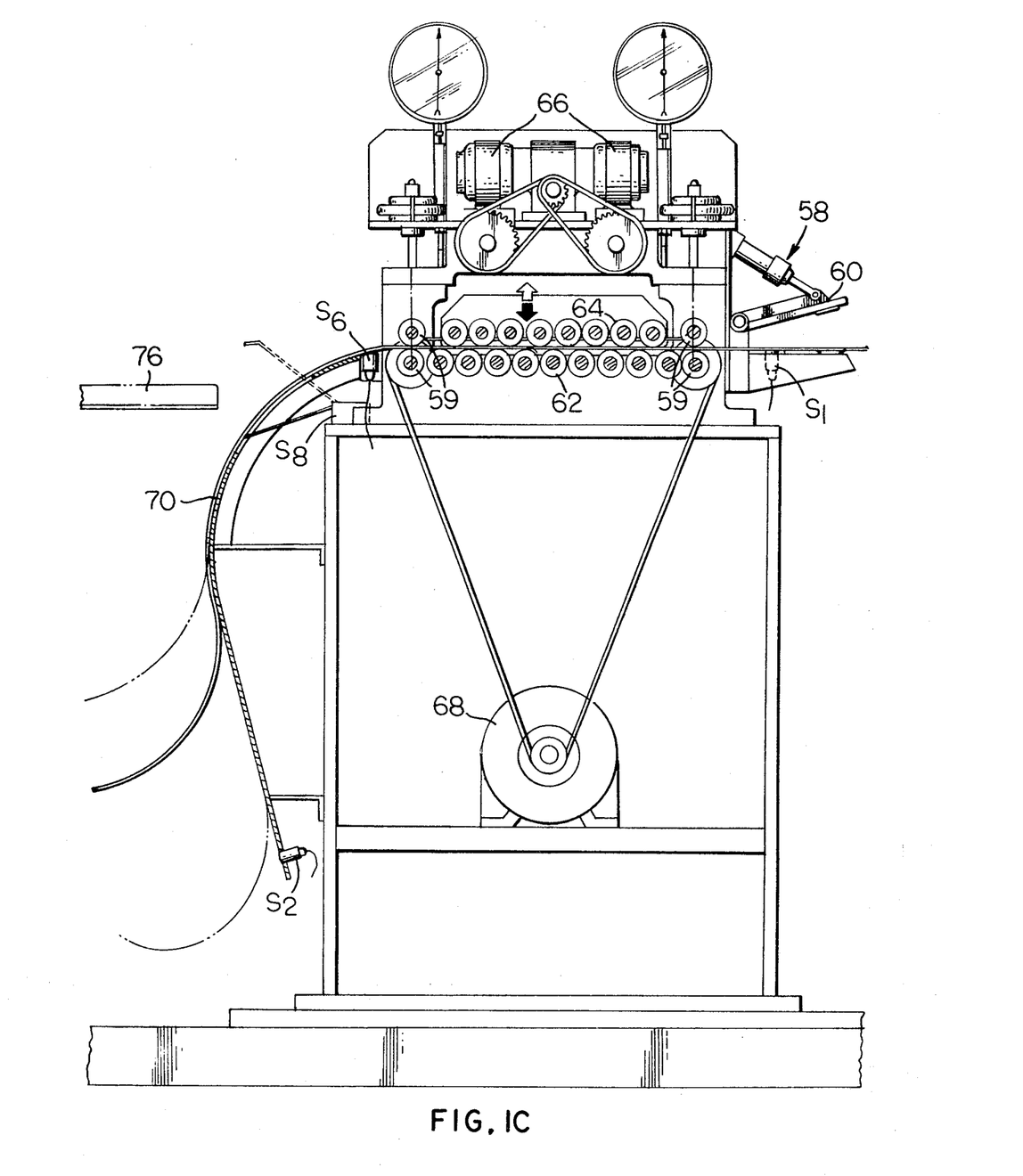

Referring to the drawings somewhat more in detail, the general arrangement of the fully automated press arrangement according to the present invention will best be seen in FIGS. 1A, 1B, 1C and 1D and in 2A, 2B and 2C. FIGS. 1A and 1B are views looking in from the front of the press with the stock feeding in from the right side, and FIG. 2A is in the form of a plan view, partly in section, looking down on top of the press. The strip of stock feeding through the press is indicated at 15.

In FIGS. 1A and 2A, the press proper is generally indicated by reference numeral 10. The press has a bed 12, a head (not shown), and uprights 16 extending between the head and bed. The press bed ordinarily carries a bolster plate 18 and slidably guided on press uprights 16 above bolster plate 18 is a press slide 20.

The bolster plate 18 and press slide 20 are adapted for detachably receiving the cooperating elements of a die set 22, and attached to the slide and bolster plate by quick acting and automatically operated clamping devices 23 having clamps 25 of the type, for example, illustrated in U.S. Pat. No. 3,327,575.

Also carried on bolster plate 18 and slide 20, at the left side of the press as it is viewed in FIG. 1A, are cooperating elements 24 of a cut off die which are connected to the bolster plate and press slide independently of the aforementioned die set 22. Leading away from the cut off die set 24 may be a scrap chute 26 to discharge cut off scrap from the press.

The die sets, one of which has been designated at 22 in FIG. 1A, are adapted for being supplied into the working space of the press from a carousel or turret type automatic die set carrier and changer generally designated with reference numeral 28 in FIG. 2A and to be described more fully hereinafter.

It is to be noted, however, that the device at 28 carries a plurality of die sets, up to eight, for example, and is adapted for selectively inserting any one of the die sets into working position in the working space of the press and for thereafter withdrawing the respective die set from the press back into the respective region provided therefor in the device 28. The automatic die set carrier and changer is provided with simple compartments for receiving the die sets to be inserted into the working space of the press.

The press slide 20 is connected by the usual connecting rod arrangement with a crankshaft in the press head. Conceivably, the press could be a hydraulically actuated press but for the purpose of the present disclosure it is considered that the press is entirely mechanical. The connection of the slide with the crankshaft of the press includes conventional adjustable means for adjusting the shut height of the press. The required shut height is determined by the respective die set which is in the press and the present invention contemplates automatically adjusting the shut height of the press in conformity with the particular die set inserted into the working space of the press. Such an adjustable means could comprise, for example, a connecting rod having one end engaging a throw of the press crankshaft and threaded at the other end for engagement with a screw rotatable on the slide. The shut height is adjusted by rotating the screw, as by a motor.

The adjustable shut height means may be constructed as shown in U.S. Pat. No. 3,233,441 with or without the locking device and substituting a power means for the hand wheel disclosed in FIG. 7.

Figure 1D:
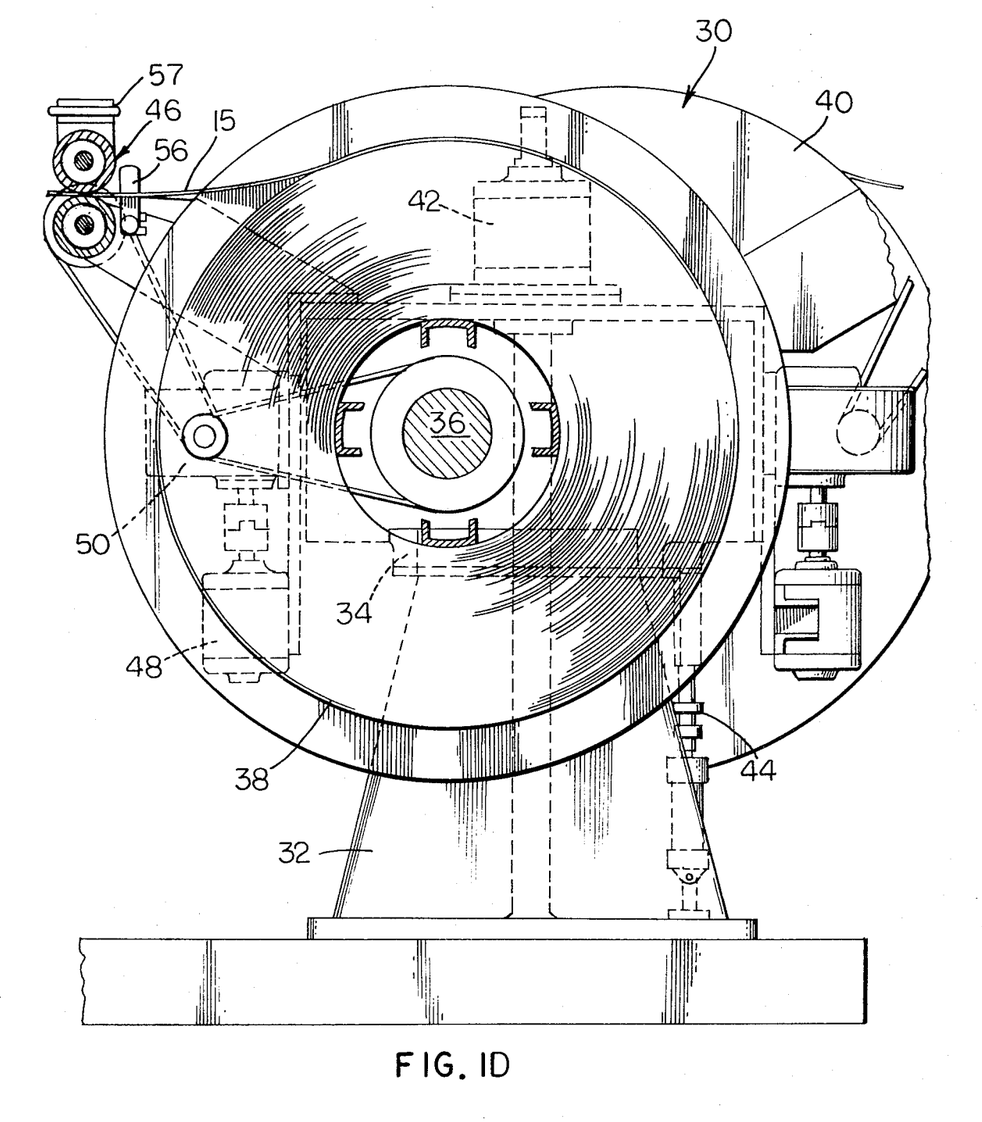
Figure 2A:
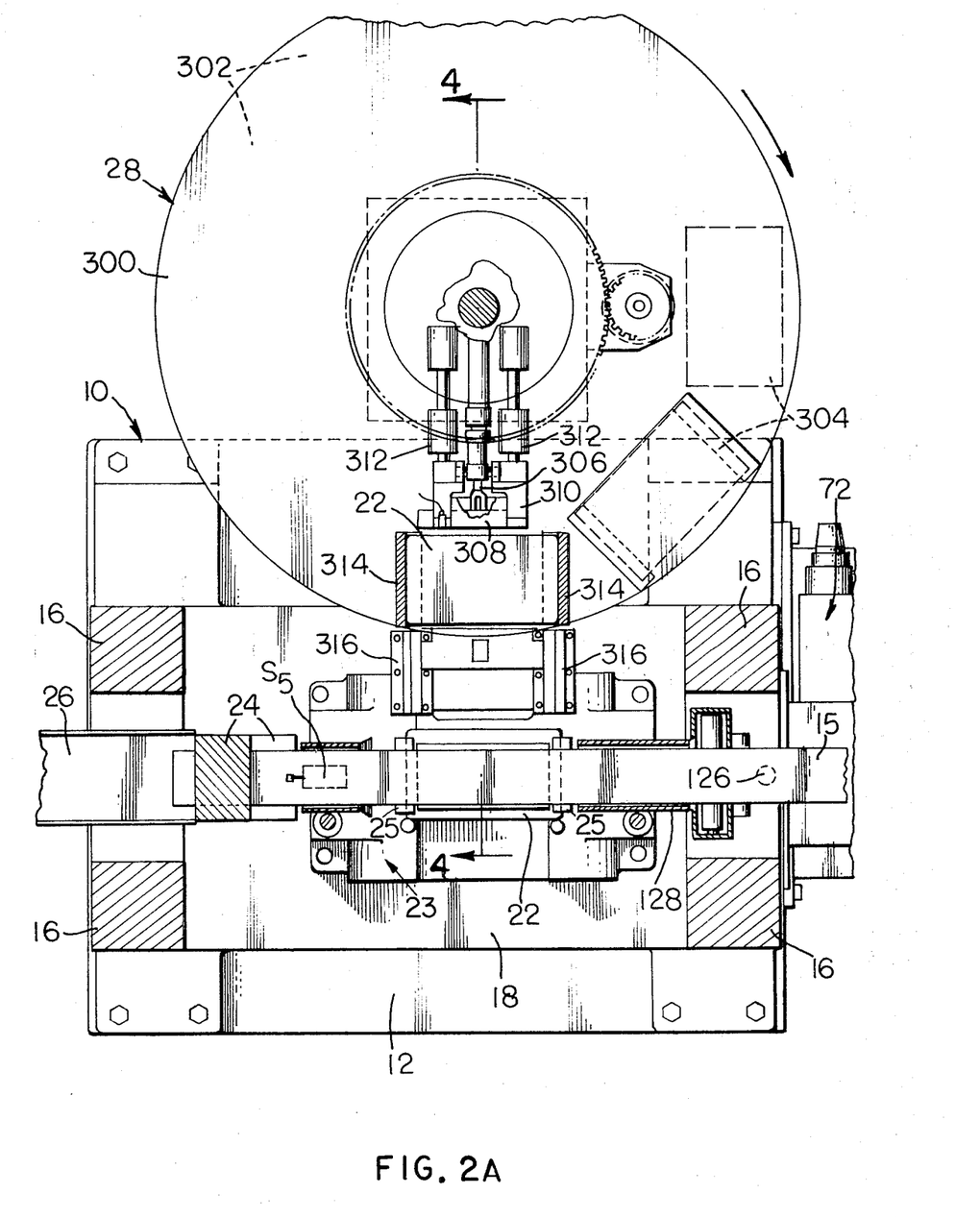
FIGS. 2A, 2B, and 2C are views looking down on the press arrangement, partly in section, and showing respective portions of the arrangement, progressing from left to right.
Figure 2B:
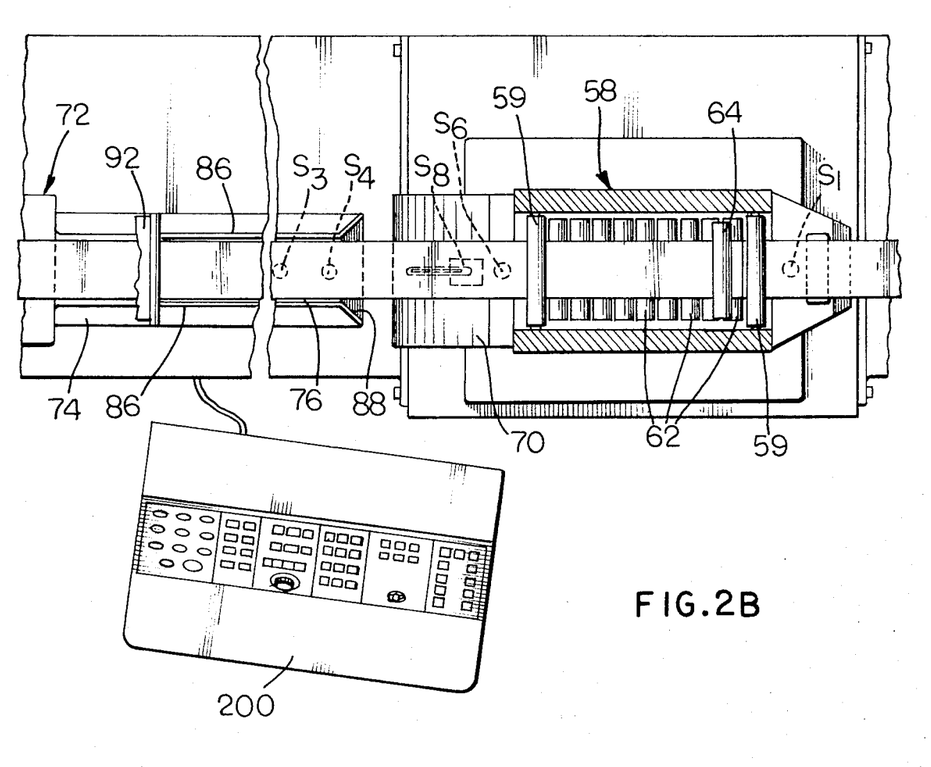
Figure 2C:
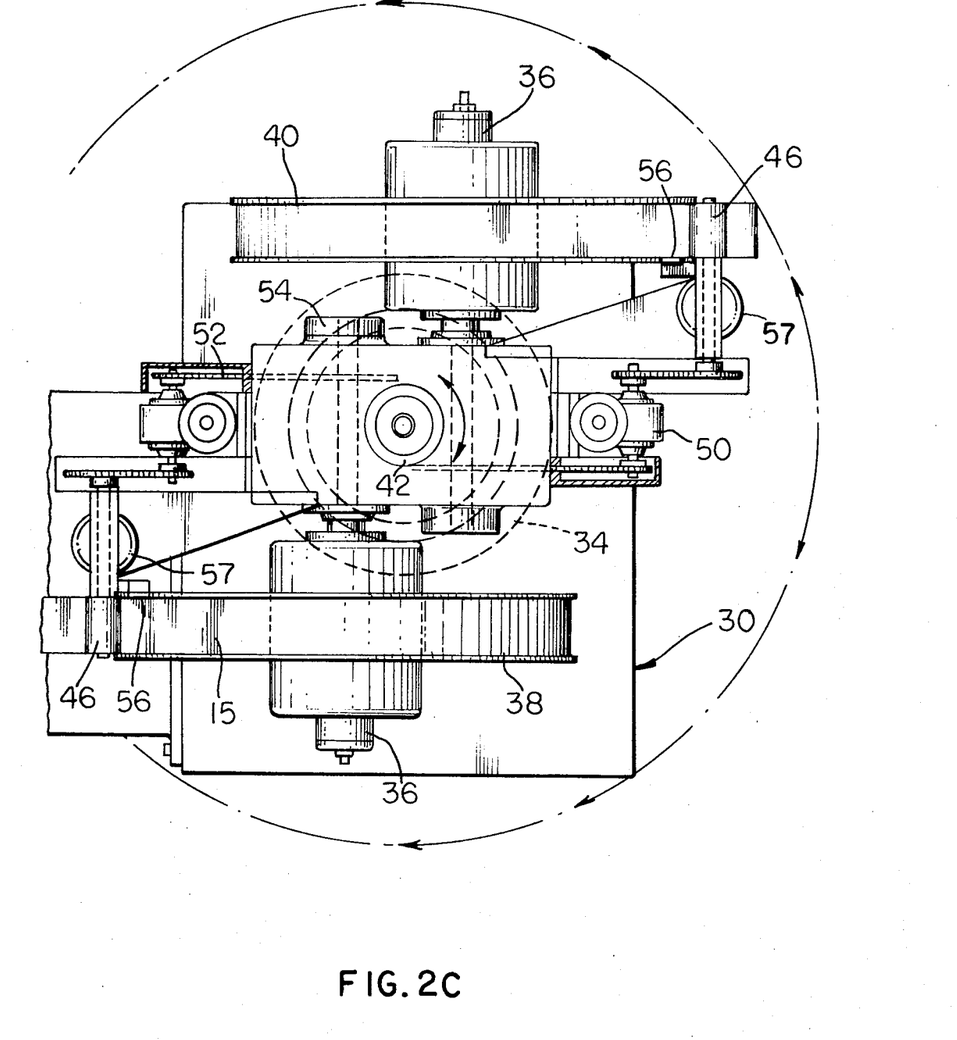

Toward the right side of the press there is a stock supply arrangement generally designated with reference numeral 30 and comprising a stationary frame 32 on which is rotatably supported a head 34 having spindles 36 adapted for supporting respective reels of stock, such as are designated 38 and 40 in FIGS. 1D and 2C.

The particular turret type stock handling arrangement illustrated shows two reels of stock but it will be understood that more reels of stock could be carried thereby if desired. Two reels of stock on the stock supply arrangement, or turret, however, show the principle of the presentation of selective supplies of stock to the press.

The head 34 of the turret type stock handler is adapted for being indexed first in one direction and then the other to bring it to operative position, but it will be understood that the indexing of the head could be in one direction only, if so desired. The head is driven in its indexing movement by an indexing motor 42 and is latched in indexed position by a retractable latch bolt 44 carried by base 32 and adapted for engagement with accurately located sockets provided therefor in the head.

The head carries a set of pinch rolls generally designated 46 for each reel of stock and adapted to be opened and closed, as by air pressure. Each set of pinch rolls is adapted for being driven in rotation by a respective reversible motor 48 which is connected through a speed reducing geared head 50 and a clutch with the pinch rolls which it drives. Each motor also drives the respective spindle carrying the stock reel via a further clutch.

The strip of stock leading from a respective reel passes through a respective adjustable back gauge 56 (FIG. 1D) to the respective set of pinch rolls and passes leftwardly therefrom to a straightening device generally indicated at 58 (FIG. 1C) and which is operable for straightening the stock fed therethrough, while simultaneously effecting controlled feeding thereof.

At the right side of the straightening device 58 is a pneumatically actuated tensioning unit at 60 which is operable to place a drag on the stock during rewinding thereof as will become more evident hereinafter. The air actuated tension unit has associated therewith a switch S1, which is a proximity switch, and which is, therefore, operable for detecting the end of the strip of stock when it is being withdrawn toward the right back to the supply reel thereof.

The straightening device 58 of FIG. 1C. consists of a series of lower rolls 62 and a series of upper rolls 64 staggered relative to the lower rolls, and between which upper and lower rolls the stock passes so as to be straightened in a more or less conventional manner. The vertical spacing between the horizontal planes in which the axes of the lower and upper sets of rolls are disposed is adjustable by motor means generally indicated at 66.

The aforementioned stock straightener consists of a pair of superimposed feed rolls 59 at each of the entrance and exit sides of the straightener and arranged in a line therebetween are the lower and upper rows of straightening rollers 62 and 64, respectively, which are staggered with respect to each other in the direction of movement of the strip of stock through the straightener.

All of the rollers are driven so as to have one and the same surface speed and adjustments are embodied in the straightener to vary the pressure of the feeding rolls therein against each other and to vary the relative vertical positions of the straightening rollers. Also embodied in the straightening device is an arrangement for permitting the rolls thereof to be separated from each other to release the stock from the straightening device for return thereof to the supply reel of the stock when the stock is withdrawn from the press.

To permit the rewinding of the stock onto the reel the rolls of the straightener and the feed rolls on the press separate from one another to release the stock so that return movement of the stock to the supply reel thereof is not inhibited by any of the said rollers. During return of the stock to the reel thereof, the reel is driven in rotation by its drive motor and tension is held on the strip of stock by the tensioning device 60 at the reel side of the straightening device. As the end of the strip of stock leaves the straightening device, the pinch rolls pertaining to the respective reel will grip the strip of stock and hold it in readiness again to be advanced into the straightening device.

The rolls of the stock straightener are driven by a drive motor 68 via a variable speed drive arrangement so that stock introduced between the rolls can be fed therethrough toward the press and at a precisely controllable and adjustable speed rate.

On the left side of the straightening device 58, which is the side toward the press, there is a curved support plate 70, the lower portion of which inclines backwardly toward the frame of the straightening device and near the bottom carries a proximity switch designated S2, which, when stock is adjacent thereto, effects the emergency stopping of the press and the stock feeding apparatus.

Normally, when the stock is being fed at the proper rate, switch S2 is not actuated.

As the end of the strip of stock emerges from the left-hand edge of the straightener it engages detector S6, which stops the advance of the stock until the straightener rolls have been automatically adjusted into their programmed positions. Thereafter the straightener drive rolls 59 assume the function of advancing or driving the stock toward the press.

On the side of the press facing the straightening device is a stock guide and feed device generally designated 72 (FIG. 1B) and through which the stock passes as it enters the press. On one side of feed device 72 is a flexible support strip 74 to the outer end of which is connected a rigid table 76. Table 76 has a lower position, in which it is shown in FIG. 1B, wherein it rests against bracket 78 attached to cylinder 80 of a piston-cylinder arrangement which has the cylinder pivotally connected at 82 to the press bed and the piston pivotally connected at 84 to the table 76.

The table 76, during operation of the press, occupies the position in which it is illustrated in FIG. 1B but during the initial and final portions of a run on a respective die set, is elevated to a position in which it is shown in dot-dash outline in FIG. 1B, and wherein table 76 and strip 74 form a horizontal support surface leading from near the discharge side of the straightening device straight across into the feeding device 72.

The table 76 has side rails 86 which, as will be seen in FIG. 2B, have a bell mouth entry portion at 88 so that stock being fed across the table will not stagger on the side rails thereof. The flexible strip, or member 74, forms an extension of table 76. An upper hinged part 92 is in the form of a stock confining guide.

The feeding device 72 has lateral stock guides therein adjustable in the lateral direction by a reversible geared head motor 100. The feed device furthermore has the driven feed roll 102 and the pressure roll 104 which bears downwardly on top of the feed roll 102. Feed roll 102 is driven by a motor 106 which also drives an incremental position encoder 108. Upper pressure roll 104 is carried on an arm 110 projecting outwardly from a lever 112 pivotally supported at 114. Lever 112, at its lower end is connected with air cushion means 116 which biases the lever in such direction as to press roll 104 down on top of roll 102 and thereby grip stock therebetween.

The upper end of lever 112 has pivoted thereto a second lever 118 which is adapted for engagement by cam 120 driven in timed relation to the press crankshaft, as by the chain drive 122. On each cycle of the press, at at least one point in the revolution of the crankshaft, when the press slide is fully extended, cam 120 will actuate lever 118 which, in turn, will actuate lever 112 to lift upper roll 104 from roll 102 and thereby release the stock from the feeding device.

On the press side of the feeding device there is provided a stock oiling arrangement of any suitable type which will maintain the surfaces of the stock clean and provided with an oil film.

There is provided, furthermore, between the oiling device and the feeding device, a pneumatically operated stock clamping device 126 which is operated in timed relation with the operation of the press and the feeding rolls during the period when stock is being threaded into the die. After the stock leaves the oiling device it passes over a stock support bridge and guide arrangement 128 and then enters the die set which is at that time mounted in the press.

Figure 5:
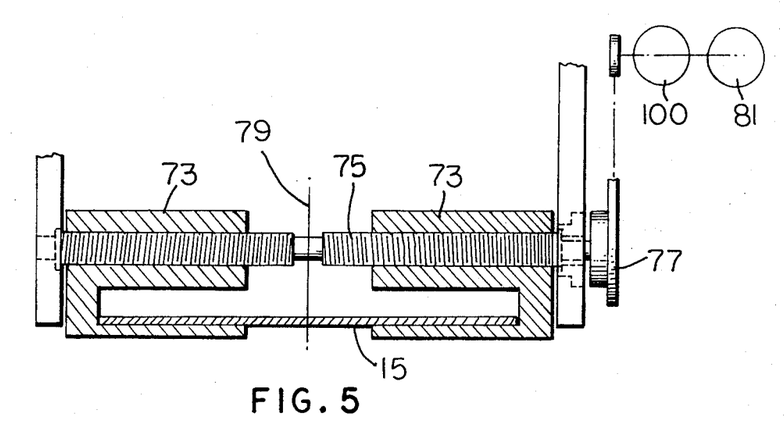
FIG. 5 is a section on line 5—5 of FIG. 1B showing the stock guides.

The stock guides above referred to comprise two sets of U-shaped members 73 (FIG. 5) which engage the stock on each side of the feed rolls. These guide members are connected by screws, at opposite ends, having the opposite ends threaded in respectively opposite directions and connected with the stock guide adjusting motor 100 as by a chain. In FIG. 5, one screw is shown at 75 with its drive sprocket 77.

The positive drive from the motor to the screws provides for a predetermined amount of lateral adjustment of the guide members toward and away from each other in symmetrical arrangement with regard to the center line 79 of the die set in the press and at a predetermined rate with respect to the rotation of the motor. This permits the motor to operate an incremental position encoder 81 thereby to feed back information to the control console regarding the precise setting of the stock guides.

Returning to table 76, toward the outer free end thereof, which is the lower end when the table is tilted downwardly to its FIG. 1 position, there are provided the spaced switches S3 and S4 which control the speed of operation of the motor 68, or the coupling thereof to the rolls of the straightening device thereby to control the rate of supply of stock therefrom towards the press. The upper one of the switches S3, when a short stock loop is detected thereby, increases the rate of stock feed, while the lower one of switches S4, when an elongated loop is detected thereby, slows the rate of stock feed.

In the event of a malfunction of the straightener resulting in an inadequate feed rate not sufficiently compensated by detector S3, the loop of stock will become smaller and the stock will begin to approach a straight line between the straightener and the feed rolls mounted on the press, whereupon detector S8 will be permitted to rise, indicating an emergency short loop condition on the console, and stops the entire operation.

As mentioned before, should the loop of stock become long enough to influence switch S2, the entire system will be stopped. Referring to motor 68, it is understood that either the motor itself is started or stopped or adjusted in speed, or the clutch connecting the motor to the straightening rolls is adjusted to provide for speed variation in the feeding of the stock, or interruption in the feeding of the stock.

Figure 3:
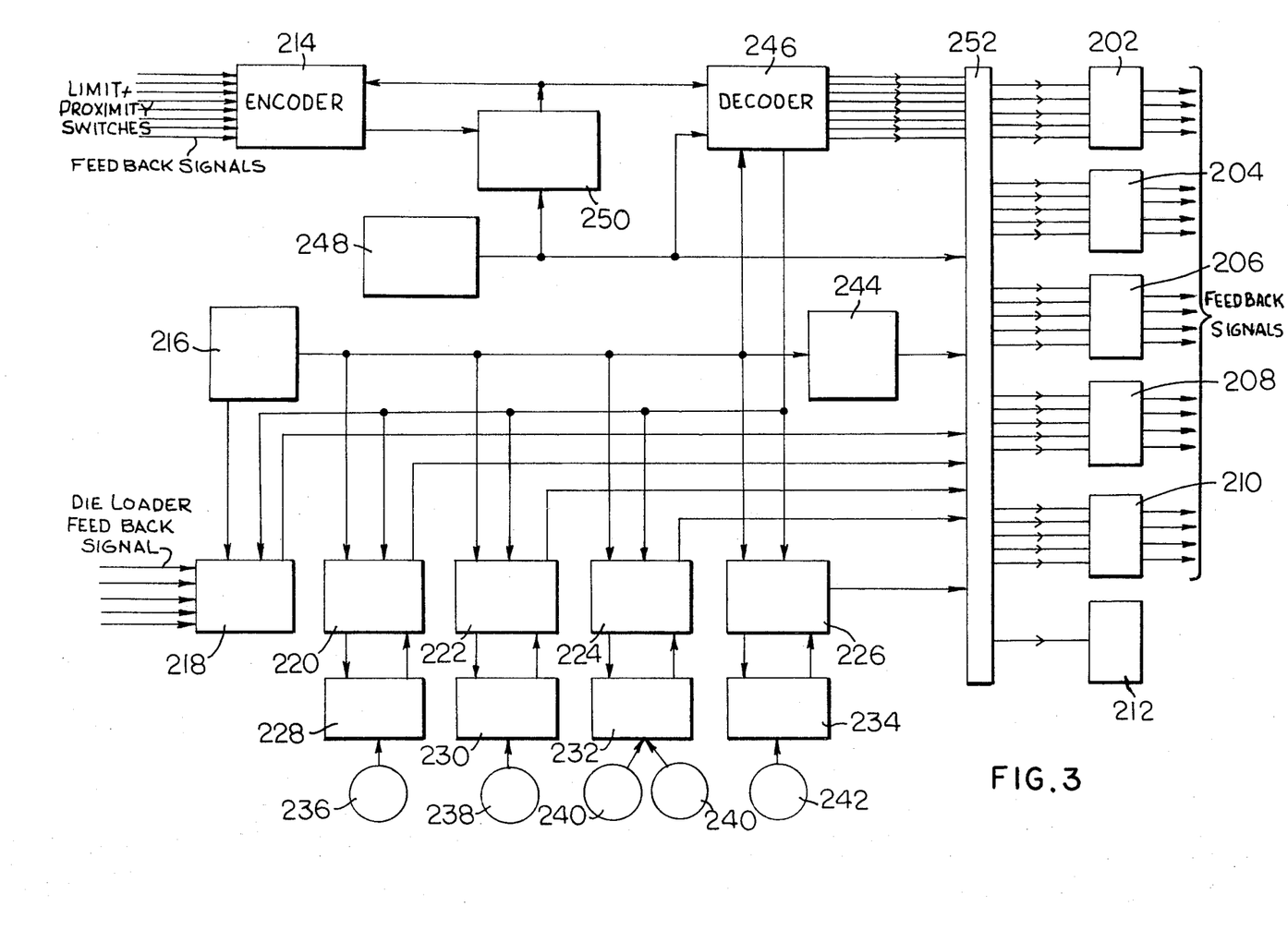
FIG. 3 is a schematic representation of the control system for the press arrangement.

Reference to FIG. 2B will show, schematically illustrated, a control console 200 from which all of the operations of the press are controlled. This console may include a card reader, punch tape reader or other device for sensing the information on a storage medium. The schematic circuitry, of which the control console forms a part, is schematically illustrated in FIG. 3. In FIG. 3, the actuators and feedback components for the press are indicated at 202, and those from the die set carrier at 204, and those from the stock feeder at 206, and those from the straightening device at 208, and those from the stock handling mechanism at 210, while 212 schematically illustrates indicators employed in the mechanism.

The feedback signals are supplied back to an input encoder 214 illustrated at the upper lefthand side of FIG. 3.

FIG. 3 also shows a card reader 216 in which a punched card is placed and from which card reader there lead the data lines to the control elements which are identified at 218 for the die loader, at 220 for the stock feed control, and at 222 for the slide position control, namely the control for the shut height of the press, at 224 for the straightener roll positions, and at 226 for the control arrangement for the stock guides embodied in the stock feeder.

Associated with component 220 is a counter register 228 and with component 222 the register 230, and with component 224 the register 232, and with component 226 the register 234. Each of the registers is supplied by a respective incremental position encoder. Register 228 is supplied by encoder 236 which is mounted on the shaft of the driven feed roll, while register 230 is supplied by encoder 238 which is contained in press slide adjusting mechanism. Counter 232 is supplied by encoder 240 on the stock straightener and register 234 is supplied by encoder 242 on the feed mechanism.

Data lines lead from card reader 216 to the press speed control component 244 and also to the output decoder 246. A manual command control component at 248 is connected to supply a sequence counter 250 which also receives increment commands from input encoder 214. The output from the sequence counter 250 is supplied to input encoder 214 and also to output decoder 246. Output decoder 246 also receives commands from manual command component 248.

Each of the components 218, 220, 222, 224 and 226 supplies signals to the power driving devices generally indicated at 252, and which power driving devices also receive output command signals from output decoder 246. It will be noted that the output decoder feeds signals back to the several components 218 to 226 referred to above and that these components are, furthermore, under the control of the various switches distributed in the circuit, such as limit switches and the like and that the input encoder 214 is also under the control of signals sent back from limit switches, including the proximity switches, etc., embodied in the circuit.

The arrangement is such that the entire operation of the press including the die loading arrangement, and the press shut height adjustment, and the stock selecting and feeding arrangement is under the control of the above described circuitry, while manual control and adjustment of the press and the components connected therewith is also possible.

Figure 4:
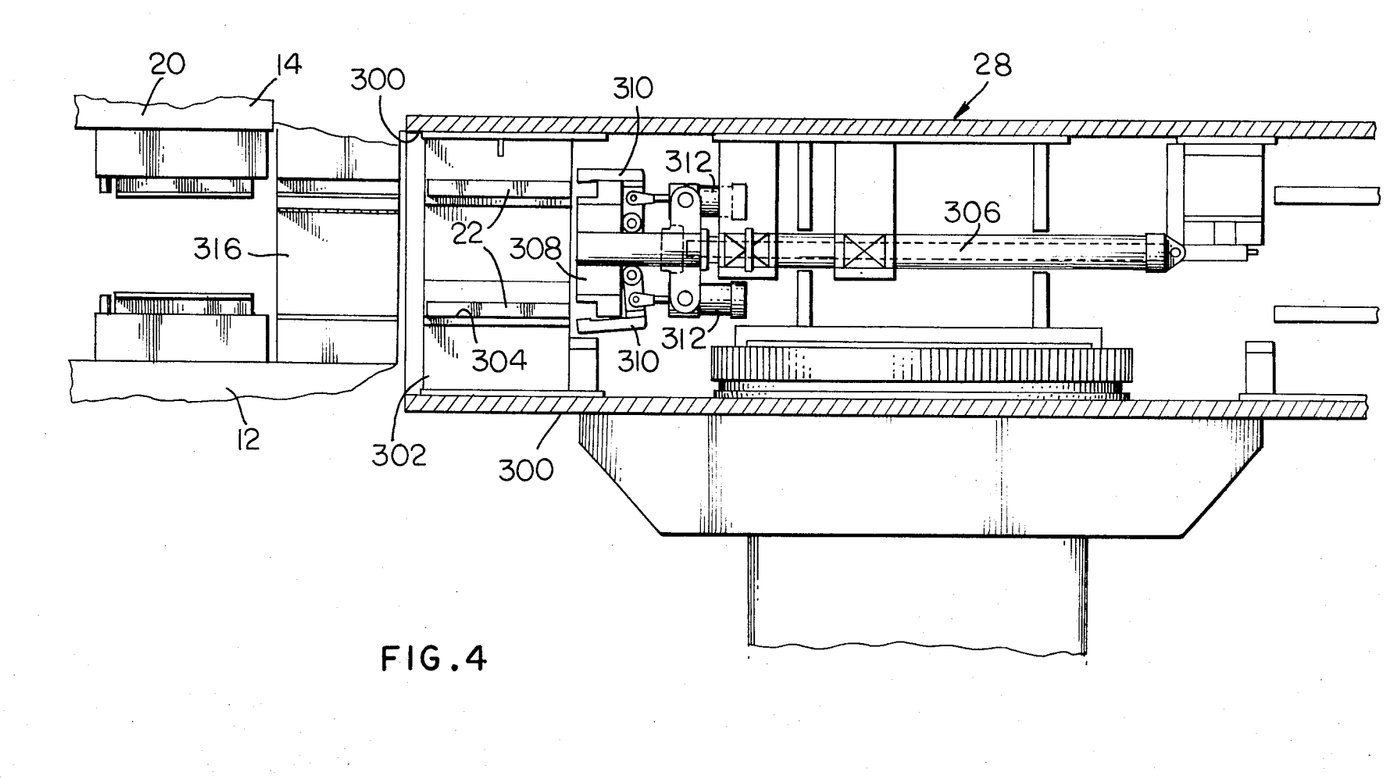
FIG. 4 is a sectional view taken on line 4—4 of FIG. 2A showing the die set carrying turret and the transfer mechanism pertaining thereto.

The aforementioned die carrier is shown somewhat schematically in FIGS. 2A and 4. In these figures it will be noted that the indexing, or rotary, die carrier comprises a pair of spaced plates 300 between which are a plurality of radially outwardly opening die set compartments 302 in which die sets 304 are disposed. The device includes a pusher ram 306 which is continuously directed toward the working space of the press and which has a pusher member 308 on the end to engage the die sets and push them into the working space of the press.

The pusher plate 308 has clamps 310 thereon for engagement with the upper and lower plates of the die set and these clamps are operated by the air cylinders 312 for a drawing out operation. When the die is put in place in the press, it is merely pushed by pusher member 308 from the respective compartment 302 into the proper location in the press and, when the die set is withdrawn from the press, the pusher member 308 is pushed into position adjacent the die set and then the clamps 310 are actuated by their respective cylinders 312 which causes the pusher member grippingly to engage the die set, whereupon it can be withdrawn from the press and back into its respective compartment.

The plates 300, or at least one thereon includes guide means 314 for guidingly engaging the respective die set and within the press, stationarily mounted therein, are further bridge guide means 316 for guiding the die set into the gripping devices or clamps carried on the bolster plate and the press slide and into which the die sets are fixedly clamped in accurately located positions preparatory to operation of the press. The press is automatically adjusted to maximum shut height prior to transfer of a die set into or out of the press.

The die set carrier is adapted for being rotated by a motor and suitable locating means are provided for latching the die set carrier in its respective rotated positions.

It has been mentioned previously that the cut off die 24 in the press is adapted for trimming the strip of material before a die set is put in place, and that the cut off die is on the opposite side of the press from the feed rolls. During a cut-off, a bridge die or support member, carried in the die set carrier, is pushed into place on the bolster plate to provide a guideway for the strip when it is pushed across the working space of the press and into the cut off die in order to have the end thereof cut off. A detector switch S5 adjacent the cut off die may be employed to control the feeding of the strip preparatory to the cut off operation and for controlling the reciprocation of the press slide to effect the cut off operation.

In operation, the operator inserts a punched card or other command program member, such as a punched or magnetic tape, into the control console of the machine and checks to make certain that the required stock for the die sets to be operated is carried by the turret type stock handling mechanism. When the operation of the machine installation is then initiated, the stock handling mechanism will, if necessary, index to present the proper coil of stock into supply position.

Stock will then be fed from the reel thereof by the pinch rolls associated therewith and into the stock straightening device which grips and feeds the stock. The support table 76 is at this time in elevated position and the stock feeds directly across this table from the straightening device and into the feed rolls carried in the feeding device 72 at the approach side of the working space of the press.

The stock guides referred to in the feeding device will be laterally adjusted toward and away from each other in response to programmed demands to accommodate the particular stock width being used and to guide the stock accurately through the center of the working area of the press.

At the beginning of the cycle, the aforementioned bridging die is already positioned in the press and the stock is supported thereon while being advanced across the working space of the press to the cut off die and wherein it is cut off by a single cycle of the press. The cut off die referred to is permanently mounted in the press and serves as a scrap cutter during normal operation of the press.

After the cut off operation, the stock feed rolls in the feeder 72 withdraw the stock from the die area so a die set can be placed in the area. Further, when the stock is withdrawn from the press, table 76 is in lowered position and the stock falls into a loop between the press feed rolls and the straightening device.

The command circuit now selects the proper die to be used and the bridging die is withdrawn back into the die set supporting turret and the turret is indexed to bring the selected die set into proper position for being inserted into the press. The die set is then pushed into the press and the automatic shut height mechanism is adjusted automatically to the correct press shut height to accommodate the respective die set.

As mentioned, table 76 is now in its lowered position and the stock forms a loop between the straightening device and the feed mechanism 72. The aforementioned switches S3 and S4 on table 72 automatically determine that the proper length of loop is hanging ahead of the feed device 72 and maintain the loop.

The control circuit supplies commands which control the operating speed of the press as well as the correct length of stock to be fed into the press on each cycle. These commands establish the correct nominal operating speed for the stock straightener mechanism to maintain the stock loop ahead of the press feed mechanism 72.

The aforementioned switchs S3 and S4 maintain a fine control of the length of the loop and adjust the speed of the stock straightener to maintain the stock loop at the proper length. When the system has been prepared in the aforementioned manner the operation will commence.

In commencing a cycle of working operations the press will accelerate to the preselected speed while the electronically controlled stock feed system will advance the precisely correct length of stock into the press on each operating cycle. An electronic counter will count the press strokes so that the number of parts made will be made known and this count can be employed for shutting down the system when the pre-programmed number of parts has been produced.

When the system shuts down at the end of a run, the press will stop with the slide at the top of its stroke and the press shut height will automatically be adjusted to maximum open position of the press. The stock is then advanced through the die area into the cut off die as previously described and is trimmed off square, thereby disposing of all of the partially formed workpieces at the end of the strip of material, and furthermore, substantially eliminating the stock loop between the straightening mechanism and the feed mechanism. The table 76 again moves up to its uppermost position and the stock straightener rolls and feed rolls are then opened and the spindle for the respective coil is driven in a direction to withdraw the stock from the machine.

During the rewinding of the strip of stock material, the tensioning unit represented by the tension plate 60 at the reel side of the stock straightener will apply tension to the stock and hold it at a certain degree of tautness as it is wound up on the reel. When the proximity switch S1 detects the end of the strip of stock, the pinch rolls for the respective stock strip will close so that the end of the stock will be held therebetween, while simultaneously the drive to the respective spindle is interrupted and tension plate 60 is raised. The die set in the press is then withdrawn into the compartment provided therefor in the rotary die set carrying and changing mechanism and, in place of the die set, the bridge die is then inserted which will assist in the feeding in of the next coil of stock to be used in the system. The cycle can then be repeated for the next die set selected by the control system.

By way of general comment on the structure of the present invention, it will be noted that the various components of the system, namely, the press and the stock straightening device and the stock turret, are fixedly interconnected by tie plates so that the assembly forms an integral unit. However, any one component, such as the driven stock straightener arrangement, or the stock handling device, can be disconnected and removed for repair, adjustment, or replacement if so desired.

It will be appreciated that control of the stock feed is maintained at all times. The length of loop hanging ahead of the feed mechanism for the press is controlled within predetermined limits and the lateral location of the stock is controlled by the laterally movable stock guides to cause the stock to feed accurately across the center of the working space of the press.

Furthermore, the rate of the stock feed both by the feed mechanism at 72, attached to the press, and by the straightening mechanism is accurately controlled at all times.

The system will run automatically and produce as many workpieces from each die set as is required and requires a minimum of attention.

Within the press is a stock clamp disposed between the feed rolls in the press and the die set and operable for clamping the stock against movement when the feed rolls are open. The clamp is especially provided to prevent the loop of stock hanging between the straightening mechanism and the press feed rolls from pulling the stock backward from the position to which it has been fed by the feed rolls when the feed rolls open.

It will be appreciated that the feeding of stock by the feed rolls on the press in intermittent, taking place in steps each time the crankshaft rotates, whereas the feeding of the stock through the power operated straightening device is continuous but at a variable rate determined by the commands read in from the punched data card, and corrected by the length of the stock loop hanging between the press feed rolls and the press side of the straightening device.

In considering the operation of the system according to the present invention, it will be appreciated that the position of the stock guides, the shut height of the press, the press speed, the rotated position of the die set turret, and the rotated position of the stock turret can all be determined with a high degree of precision by conventional feedback devices, such as pulse generators, tachometers, proximity sensors, or limit switches so that the positioning of these elements by the use of a programmed control system presents no problems.

The stock feed at the press can be controlled with an adequate degree of precision by a feedback control system employing an incremental position encoder to measure the rotation of the feed rolls in the press which in turn, are driven by an electric motor, while the rate of supply of stock from the straightening device can be roughly preselected by the control system and thereafter adjusted in conformity with the size of the loop of stock hanging between the press feed rolls and the straightening device.

The term "pressing," as used in the claims, includes blanking, coining, extruding, compacting, forging, forming, die casting, stamping, embossing, cutting, shearing, punching, molding and assembly pressing.

While the present invention has been illustrated in the specific embodiment as being directly responsive to the card input, it should now be clear that an intermediate general purpose computer could be employed between the card input and other control circuitry to control one or a number of presses.

Modifications in structure as well as programming may be made. For example, the feeding unit can be constructed to deliver to the press individual sheets or strips of material for pressing as well as individual workpiece blanks, pre-formed workpieces, or semi-finished workpieces; granular or powdered materials may be introduced into the press for compacting; and liquid materials may be introduced into the dies in the press for molding. The programming sequence can be varied to change the order in which various steps of the operation are performed, particularly in the introduction of new or fresh stock or material and the removal from the press of remaining stock or material at the completion of pressing operations. Other variations possible in the programming relate to the options available to the user such as the use of fixed cut off dies within the press versus the use of cut off dies carried in the die set storage and changing unit. Further options include the choice of slide position and shut height adjustment at which the function of die set changing is performed. In one form of the automatic stamping arrangement the press slide is positioned at the top of its stroke with the shut height adjusted to maximum open position to receive or interchange dies with the die storage and handling unit. An alternative arrangement could permit any preselected slide position and shut height to be used for die changing, while another variation of the system could employ a die changing mechanism having the ability to seek and locate any arbitrary position of the press slide and perform the die changing function at such arbitrary position. The die changing mechanism might handle a die set in the closed position of the die set so that the die set might be handled as though it were a single piece rather than composed of two distinct elements. For such a means of die set handling the press slide position and its shut height could be so programmed as to locate the slide relative to the press bed so that the closed die set could be inserted as an assembly. As illustrated above, programming variations may be made and the above examples are cited merely as representative of alterations possible within the scope of the invention.

What is claimed is:

1. An integrated pressing arrangement comprising a press having a bed and a reciprocable slide, said slide and bed defining therebetween a working space, a die set storage device cooperating with the press adapted for storing a plurality of die sets for use in the press, said storage device having movable members to locate a selected die set in a position of alignment with said working space of the press, said storage device including power operable means to move a die set in said position from the storage device into the working space of the press and to withdraw the die set from the press back into the storage device, means for holding said die set in said press and control means operable for selecting a die set and for controlling the operation of said press and the said movable members of said storage device and the actuation of said power operable means.

2. An arrangement according to claim 1 in which said storage device is rotatable and comprises a plurality of circumferentially distributed compartments for receiving die sets.

3. An arrangement according to claim 1 wherein said holding means include clamps to clamp the respective parts of die sets thereto and said press includes means for adjusting the shut height thereof, the said storage device including means for transporting the die sets and for placing said die sets in said clamps on said bed and slide when the slide is located at a predetermined position of its stroke and the press is adjusted for a predetermined shut height.

4. An arrangement according to claim 1 in which said control system is operable to effect positioning of said slide and to effect adjustment of the slide to a shut height permitting the exchange of a die set between said press and said storage device.

5. An arrangement according to claim 3 which includes bridging guides extending from said transporting means to said clamps.

6. An arrangement according to claim 1 which includes supply means for supplying material to said press for being acted upon in the die set in the press.

7. An arrangement according to claim 6 wherein the supply means includes a support means for supporting a reel of stock and feeding means for threading said stock from said reel toward said press.

8. An arrangement according to claim 7 which includes an intermittent feed means associated with the press for feeding a predetermined length of material on each press stroke in timed relationship to the press operation.

9. An arrangement according to claim 8 which includes a guide means for supporting flexible material as it is threaded into the press, said guide means adapted to permit said flexible material to form a loop between the intermittent feed means and the material supply means.

10. An arrangement according to claim 6 wherein the supply means includes a plurality of support means for supporting reels of stock and being movable for presenting said reels selectively to a supply position, and means operated by said control means for actuating said supply means to move a coil of stock thereon which corresponds to the selected die set into said supply position.

11. An arrangement according to claim 6 wherein the supply means includes means for accepting individual pieces of material and transferring said individual pieces to said press.

12. An arrangement according to claim 6 which includes feed means for feeding stock from said supply means to said die set, said feed means including power operated straightener means receiving the stock from a respective reel in supply position and power operated intermittent feed means on the press receiving the stock from said straightener and supplying the stock to the respective die set in the press.

13. An arrangement according to claim 12 which includes a table having one end pivotally supported adjacent the intermittent feed means on the press and having the other end tiltable from an upper position adjacent the exit side of said straightening means to a lower position, means for tilting said table to the upper position thereof for the initial supply of stock from a reel to said intermittent feed means and for tilting the table to the lower position thereof prior to the initiation of the operation of said press, said control means actuating said straightening means after downward tilting of said table to maintain a stock loop ahead of said intermittent feed means.

14. An arrangement according to claim 9 which includes means for sensing the length of said stock loop and for adjusting the speed of said feeding means to maintain the length of the loop substantially constant.

15. An arrangement according to claim 14 which includes means operable in response to the said loop exceeding a predetermined maximum length of interrupting the feeding of stock from said feeding means.

16. An arrangement according to claim 9 which includes sensing means operable in response to the loop being less than a predetermined minimum length to stop operation of said feed means and said press.

17. An arrangement according to claim 7 which includes elements of a cut off die positioned at a predetermined location in the press for establishing a length reference on the strip of stock by cutting of the end of the strip, and means for retracting the strip a predetermined distance.

18. An arrangement according to claim 8 which includes elements of a cut off die on said slide and bed at the side thereof opposite said intermittent feed means, bridging die means carried by said storage device insertable into the press to bridge between said intermittent feed means and said cut off die, means operable prior to the insertion of a die set into said press and following the retraction of a die set from the press for inserting said bridging die means into the press and for actuating said intermittent feed means for advancing the stock from said intermittent feed means across said bridging die means to said cut off die and for actuating the press to cut off the stock and for then actuating said intermittent feed means for retracting the stock from the working space of the press by a predetermined distance.

19. In a press having a bed and a slide and holding means thereon adapted for receiving the parts of a die set, said press having shut height adjusting means associated therewith, die set storage means associated with the press supporting die sets with the parts thereof arranged to be received in said holding means when the press slide and shut height adjustments are in predetermined positions, transfer means associated with said storage means operable for transferring die sets from said storage means to said holding means and from said holding means back to said storage means, and programmed control means operable for adjusting said slide and shut height to predetermined positions for the transfer of die sets between said press and storage means, and for actuating said transfer means to transfer a die set in transfer position from said storage means to said holding means and then back to said storage means, and for actuating said shut height adjusting means when a die set is in said holding means to adjust the shut height of the press in conformity with the respective die set.

20. A press according to claim 1 which includes stock supply means associated with the press supporting reels of stock and movable to present said reels selectively to a supply position, said press including stock feed means for feeding stock to the die set in the press, said stock supply means including stock actuating means operable to insert stock from the reel in supply position into said feed means and to withdraw the stock from said feed means, said control means also being operable for moving said stock supply means to present the reel of stock thereon which conforms to a selected die set to supply position and for actuating said stock actuating means to insert the selected stock into said feed means while the respective die set is in the press and to withdraw the stock from the feed means when the respective die set is to be withdrawn from the press.

21. In a press having means for detachably receiving die sets and operable for actuating the die sets to form workpieces therein and also having feed means to feed strip stock to a die set in the press, a die set storage device associated with the press adapted to store a plurality of die sets and having a transfer means to present the die sets therein selectively into transfer position for movement into and out of said press and also including transfer means for transferring die sets when in said transfer position into the press and from the press back into the storage device, a stock storage device associated with the press adapted to store reels of stock and having transporting means to present said reels selectively into supply position to supply said feed means and also including stock drive means to drive the stock to said feed means and to withdraw the stock from said feed means, and programmed control means connected in controlling relation to said press and to said transporting means and to said feed means and said stock drive means and transfer means, said programmed control means being operable to cause selected die sets to be moved sequentially into transfer position and to be transferred into said press and withdrawn therefrom and for a selected reel of stock to be moved into supply position for each die set transferred into the press and for the stock to be supplied to said feed means, said programmed control means also being operable for actuating said press while a respective die set is in the press and for causing said feed means to feed stock to the die set, said programmed control means being operable upon a predetermined number of workpieces being produced by a respective die set to interrupt operation of said press and to cause withdrawal of the respective die set from the press and withdrawal of the respective stock from said feed means.

22. The method of remotely controlling a press which comprises the steps of (1) inserting a selected die set into a working position within the press (2) threading selected stock material from a coil stock material supply to a feed unit, (3) incrementally advancing the selected stock material into the die set within the press (4) operating the press with the die set in the press while intermittently feeding the stock material into the die set to produce a number of workpieces with the die set, and carrying out each of the foregoing steps by a remote control.

23. The method of remotely operating a press which comprises the steps of: (1) storing a plurality of die sets to be used with the press, storing reels of strip stock to be used with the press, (2) inserting a selected die set in said press, supplying stock to the press from a selected reel for the die set in the press, (3) operating the press while the die set is in the press while feeding the stock from the selected reel to the die set to produce a predetermined number of workpieces with the die set, and carrying out the foregoing steps in a predetermined cycle.

24. The method according to claim 23 which includes the further step of cutting off a partially completed workpieces at the end of the stock after the said predetermined number of workpieces have been produced in the respective die set to remove the partially formed workpieces from the stock.

25. The method according to claim 23 which includes the further step of selecting a speed of operation of the press for each die set placed in the press by a programmed control means.

26. The method according to claim 23 which includes the further step of selecting a length of feed of the stock for each die set placed in the press by a programmed control means.

27. The method according to claim 23 which includes the further step of locating the side edges of the stock with stock guides near the die set and adjusting the spacing between the stock guides in relation to the width of stock selected by a programmed control means.

28. The method according to claim 23 which includes the further step of forming a loop in the stock between the die set and the reel supplying the die set, feeding the stock toward the die set at both ends of said loop and adjusting the rate of said feed at the reel end of said loop to maintain the size of the loop within predetermined limits by a programmed control means.

29. The method according to claim 28 which includes the further step of straightening the stock simultaneously with the feeding thereof at the reel side of said loop.

30. The method according to claim 28 which includes the further steps of feeding the stock at the die set end of the loop intermittently while feeding the stock at the reel end of the loop continuously.

31. The method according to claim 24 which includes the further steps of withdrawing the stock from the press after trimming of the stock and also withdrawing the respective die set from the press.

32. The method according to claim 23 which includes establishing an accurately known position of the end of the stock by the steps of threading the end of stock through a cut off die at a known location in the press and operating the cut off die to cut off the end of the stock.

33. The method according to claim 23 which includes the further step of adjusting the press shut height for the selected die set by a programmed control means.

34. A method of operating a program controlled pressing system comprising the steps of:
1. inserting instructions to a program storage unit,
2. issuing instructions from the program storage unit to actuate a die set storage and change unit to transfer a die set, a stock feed unit for intermittently transferring stock in conformity with the amount required on each stroke of the press and adjusting the parameters of the press to adapt the press to the respective die set received from the storage and change unit in accordance with said instructions to repetitively produce a number of workpieces.

35. A method in accordance with claim 34 wherein the step of inserting instructions comprises sensing the information on a storage medium.

36. A method in accordance with claim 34 wherein the step of inserting instructions comprises sensing the information on a storage medium and then translating the thus sensed information into a form for storage in said program storage unit.

37. A method of operating a program controlled pressing system comprising the steps of: (1) encoding information on a program storage medium (2) reading the information from the storage medium (3) directing the operation of the pressing system including the shut height adjustment of a press, the feed length of stock from a stock feeding unit, and the selection of a die set from a die set storage unit in accordance with the thus read information.

38. The method of remotely operating a press which comprises the steps of (1) storing a number of die sets to be used with the press (2) storing stock to be used with the press, inserting a selected die set in the press, (3) adjusting the press parameters to adapt the press to the respective die set, (4) feeding stock to the press for the selected die set (5) operating the press with the die set in the press while repetitively feeding the stock to the die set to produce a number of workpieces with the die set, and carrying out the foregoing steps in a programmed sequence.

* * * * *